United States Patent
Tabb (10) Patent No.: US 6,321,954 B1
(45) Date of Patent: Nov. 27, 2001

(54) MANURE GRINDING FERTILIZER SPREADER

(76) Inventor: Dwight Stephen Tabb, 23919 Wolf Branch Rd., Sorrento, FL (US) 32776

( * ) Notice: Subject to any disclaimer, the term of this patent is extended or adjusted under 35 U.S.C. 154(b) by 0 days.

(21) Appl. No.: 09/768,960

(22) Filed: Jan. 24, 2001

(51) Int. Cl.$^7$ .................................................. A10C 3/06
(52) U.S. Cl. ............................................ 222/623; 239/657
(58) Field of Search ........................... 222/623; 239/657; 414/439

(56) References Cited

U.S. PATENT DOCUMENTS

| | | |
|---|---|---|
| 75,601 | 3/1868 | Tilton . |
| 862,948 | 8/1907 | Uribe . |
| 876,076 | 1/1908 | Heady . |
| 1,835,641 | 12/1931 | Finfrock . |
| 2,350,107 | 5/1944 | Gandrud . |
| 2,544,637 | 5/1951 | Rerick . |
| 2,558,352 | 6/1951 | Gandrud . |
| 2,680,539 | 6/1954 | Seltzer . |
| 5,850,975 | * 12/1998 | Bauer .................................. 239/657 |

* cited by examiner

Primary Examiner—Philippe Derakshani
(74) Attorney, Agent, or Firm—Edward M. Livingston, Esq.

(57) ABSTRACT

A manure-grinding fertilizer spreader has a spiral-bladed cylinder (1) as a preferred progressively bladed cylinder (17) at a bottom of a funneled mobile hopper (11) with a grinder base (12) proximate a discharge aperture (13). In a small, few-animal embodiment, the mobile funneled hopper is hand-cart sized to be hand-pulled or small-tractor-pulled with the spiral-bladed cylinder being rotated by detachable engagement of wheels (15) with a cutter axle (10) on which the spiral-bladed cylinder is situated axially. In a powered embodiment for all sizes, the spiral-bladed cylinder is rotated by an engine (35) in close proximity to a grinder blade (22) on the grinder base to cut stable-bedding straw and hard manure for pulverized spreading. In large commercial sizes, the funneled hopper can be at an end of a container bed (27) from which manure is belt-conveyed to the mobile hopper for grinding and spreading.

25 Claims, 7 Drawing Sheets

MANURE GRINDING FERTILIZER SPREADER

BACKGROUND OF THE INVENTION

This invention relates to fertilizer spreaders and in particular to a fertilizer spreader that grinds, chops and selectively pulverizes horse and other animal fertilizer and straw-like stable bedding for uniform spreading on land.

Numerous fertilizer spreaders are known. None are known, however, to grind, chop and selectively pulverize animal manure in a manner taught by this invention.

Examples of most-closely related known but yet incomparably different devices are described in the following patent documents:

| Number | Date | Inventor | Classification |
| --- | --- | --- | --- |
| U.S. Pat. No. 2,680,539 | 06/08/1954 | Seltzer | 222/177 |
| U.S. Pat. No. 2,554,637 | 05/29/1951 | Rerick | 222/267 |
| U.S. Pat. No. 2,558,352 | 06/26/1951 | Gandrud | 275/2 |
| U.S. Pat. No. 2,350,107 | 05/30/1944 | Gandrud | 275/2 |
| U.S. Pat. No. 1,835,641 | 12/08/1931 | Finfrock | |
| U.S. Pat. No. 876,076 | 01/07/1908 | Mylor, et al. | |
| U.S. Pat. No. 862,948 | 08/13/1907 | De Uribe | |
| U.S. Pat. No. 75,601 | 03/17/1868 | Tilton | |

SUMMARY OF THE INVENTION

Objects of patentable novelty and utility taught by this invention are to provide a manure-grinding fertilizer spreader which:

grinds, chops and selectively pulverizes animal manure while being spread;

can be made in small sizes for handling and spreading manure of one-to-few horses or other pets conveniently and inexpensively;

can be made in medium sizes for handling and spreading manure of up to a dozen horses or other pets conveniently and inexpensively; and can be made in commercial sizes for spreading manure of large herds of stabled horses, cows, fowl and other animals cost-effectively.

This invention accomplishes these and other objectives with a manure-grinding fertilizer spreader having a spiral-bladed cylinder at a bottom of a mobile funneled hopper with a grinder base proximate a discharge aperture. In a small, few-animal embodiment, the mobile funneled hopper is hand-cart sized to be hand-pulled or small-tractor-pulled with the spiral-bladed cylinder being rotated by detachable engagement of wheels with an axle on which the spiral-bladed cylinder is situated axially. In a powered embodiment for all sizes, the spiral-bladed cylinder is rotated by a motor in close proximity to a blade on the grinder base to cut stable-bedding straw and hard manure for pulverized spreading. In large commercial sizes, the funneled hopper can be at an end of a spreader vehicle from which manure is belt-conveyed to the hopper for grinding and spreading.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

Figure 18:
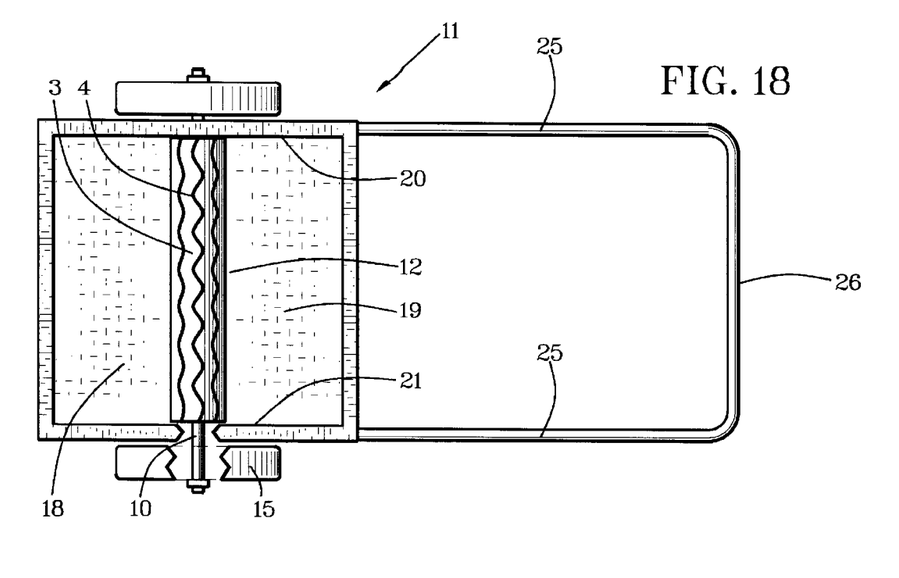
FIG. 18 is a partially cutaway top view of the mobile hopper having wave blades for the progressively bladed cylinder.
Figure 19:
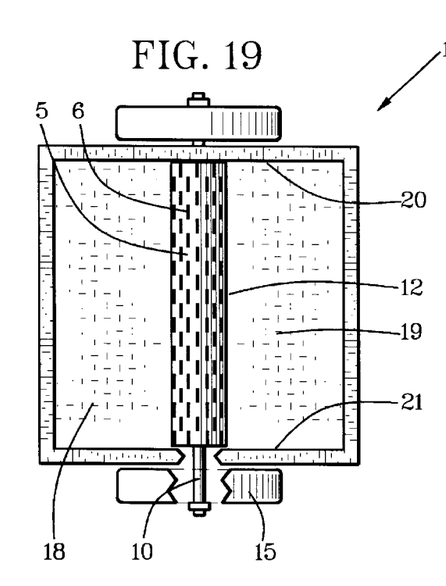
FIG. 19 is a partially cutaway top view of the mobile hopper having staggered blades for the progressively bladed cylinder.
Figure 20:
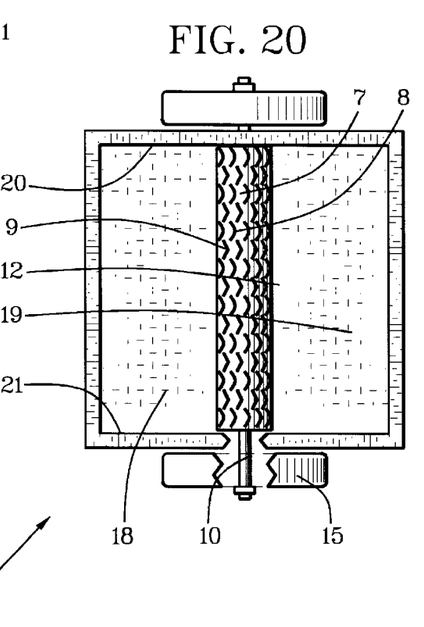
FIG. 20 is a partially cutaway top view of the mobile hopper having arcuate and dihedral blades for the progressively bladed cylinder.

1. Spiral-bladed cylinder
2. Spiral blades
3. Wave-bladed cylinder
4. Waved blades
5. Stagger-bladed cylinder
6. Staggered blades
7. Arcuate-bladed cylinder
8. Arcuate blades
9. Dihedral blades
10. Cutter axle
11. Mobile hopper
12. Grinder base
13. Discharge aperture
14. Fastener lever
15. Wheels
16. Progressive blades
17. Progressively bladed cylinder
18. Back wall
19. Front wall
20. First side wall
21. Second side wall
22. Grinder blade
23. Tongue
24. Tractor attachment
25. Handcart traces
26. Cross rod
27. Container bed
28. Floor
29. Conveyor belt
30. Conveyor wheel
31. Flow-control gate
32. Conveyor V-belt
33. First V-belt wheel
34. Second V-belt wheel
35. Engine
36. Cutter V-belt
37. Cutter-belt wheel
38. Wheel V-belt
39. Engine V-belt wheel
40. Idler wheel
41. Engine platform
42. Wheel struts
43. Pivot fastener
44. Wheel protrusion
45. Hub protrusion
46. Lock cam Reference is made to FIGS. 1–3, 7–8, 10–13 and 17–19. A progressively bladed cylinder, including a spiral-bladed cylinder 1 shown in FIGS. 1, 3–4, 6–7 and 9 has a plurality of spiral blades 2 disposed circumferentially on an outside periphery of the spiral-bladed cylinder 1. Also included as progressively bladed cylinders are a wave-bladed cylinder 3 with waved blades 4 shown in FIG. 18, a stagger-bladed cylinder 5 with staggered blades 6 shown in FIG. 19, and an arcuate-bladed cylinder 7 with arcuate blades 8 and dihedral blades 9 shown in FIG. 20.

The progressively bladed cylinders are attached concentrically to a cutter axle proximate a bottom of a mobile hopper 11 having a grinder base 12 in predetermined proximity to cutting edges of a plurality of the progressive blades. A discharge aperture 13 in a bottom hopper portion and downward from the grinder base 12 has parallel sides that are oppositely disposed a distance for receiving a predetermined portion of the progressively bladed cylinder.

A rotational power source in rotational communication with the cutter axle 10 for rotation of the progressively bladed cylinder proximate the bottom of the mobile hopper 11 includes a rotational connection that is a fastener lever 14, shown in FIGS. 2, 5 and 7–8, to connect wheels 15 of the mobile hopper 11 to the cutter axle 10 by rotation of the wheels 15 from movement of the mobile hopper 11. The fastener lever 14 is attached pivotally to axle 10 with a pivot fastener 43 for being pivoted to contact with a wheel protrusion 44 or a hub protrusion 45 for transmitting rotation of the wheel 15 to the cutter axle 10. A lock cam 46 can be provided on a leaf-spring V-leg of the fastener lever 14 for hand-operable spring retainment of the fastener lever 14 in a pivoted position of contact with the wheel protrusion 44 or the hub protrusion 45 over the cutter axle 10 or in a pivoted position of non-contact with the wheel protrusion 44 or the hub protrusion 45 under the cutter axle 10 selectively.

As shown in FIGS. 11–14 and 18–20, progressive blades 16 which are representative of the spiral blades 2, the waved blades 4, the staggered blades 6, the arcuate blades 8 and the dihedral blades 9, have a predetermined closeness circumferentially on a progressively bladed cylinder 17. The progressively bladed cylinder 17 is representative of the spiral-bladed cylinder 1, the wave-bladed cylinder 3, the stagger-bladed cylinder 5 and the arcuate-bladed cylinder 7. The progressive blades 16 also have predetermined heights radially outward from the progressively bladed cylinder 17 for predetermined fineness of grinding of material intermediate the grinder base 12 and top edges of variants of the progressive blades 16.

The discharge apertures 13 are rectangular intermediate a back wall 18, a front wall 19, a first side wall 20 and a second side wall 21. A bottom portion of the front wall 19 can be the grinder base 12 and optionally can contain a grinder blade 22. Use of the grinder blade 22 that is preferably replaceable, position- adjustable and capable of being reconditioned allows lighter and less expensive construction for most of the mobile hopper 11. The grinder blade 22 also allows use of engine power for rotation of the cutter axle 10 to cut stable-bedding straw and other tough items, including hard-dried manure.

Figure 11:
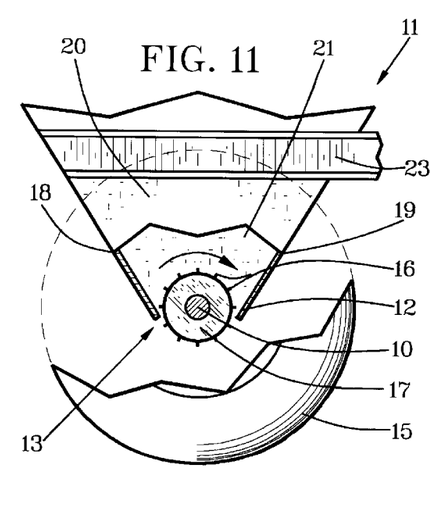
FIG. 11 is a partially cutaway side view of a discharge aperture without a grinder blade and situated below a horizontal center of a cutter cylinder.
Figure 12:
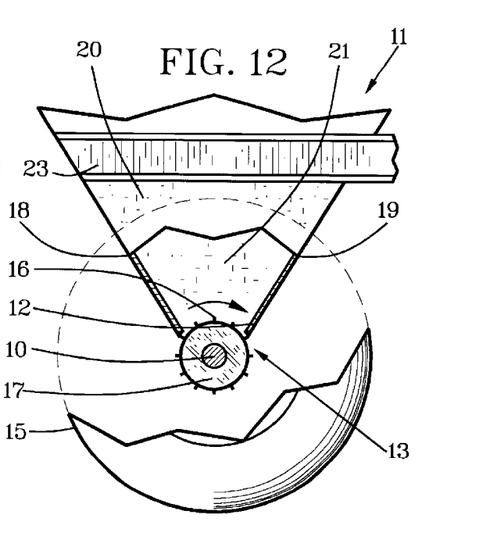
FIG. 12 is a partially cutaway side view of a discharge aperture without a grinder blade and situated above the horizontal center of the cutter cylinder.
Figure 13:
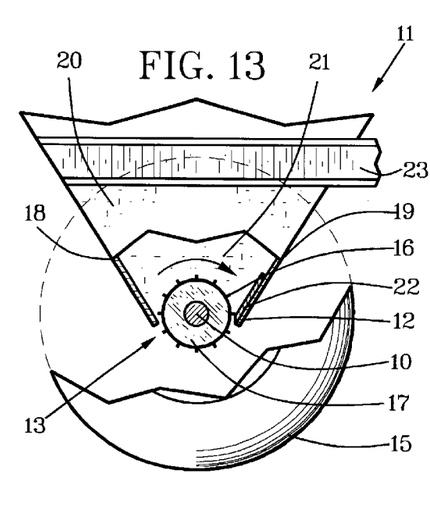
FIG. 13 is a partially cutaway side view of a discharge aperture with a grinder blade and situated below the horizontal center of the cutter cylinder.
Figure 14:
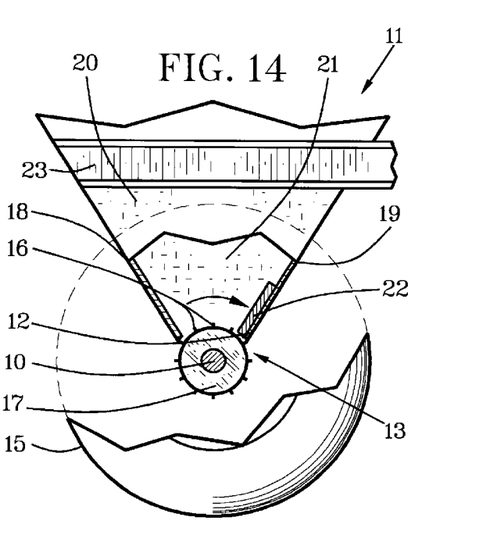
FIG. 14 is a partially cutaway side view of a discharge aperture with the grinder blade and situated above the horizontal center of the cutter cylinder.

The discharge aperture 13 can be structured for grinding with the grinder base 12 and an optional grinder blade 22 below a major circumferential portion of the progressively bladed cylinder 17 or variants thereof as shown in FIGS. 11 and 13. Optionally, the grinder base 12 and the optional grinder blade 22 can be above the major circumferential portion of the progressively bladed cylinder 17 or variants thereof as shown in FIGS. 12 and 14.

As shown in FIGS. 1–3 and 15–17, the mobile-power attachment can include a tongue 23 with a tractor attachment 24 on the mobile hopper 11. Optionally as shown in FIGS. 4–10 and 18 for lighter embodiments, the mobile-power attachment can include handcart traces 25 spaced apart to receive an individual between them and have a front cross rod 26.

Optional to the fastener lever 14 for rotational fastening of the wheels 15 to the cutter axle 10, the rotational power source can include geared rotational communication with either the spiral-bladed cylinder 1, the wave-bladed cylinder 3, the stagger-bladed cylinder 5, the arcuate-bladed cylinder 7 as variants of the progressively bladed cylinder 17. Geared rotational communication can include hard gears, select keys in combination with select keyways, or preferably for most uses, a belt gear as shown in FIGS. 15–17.

Figure 15:
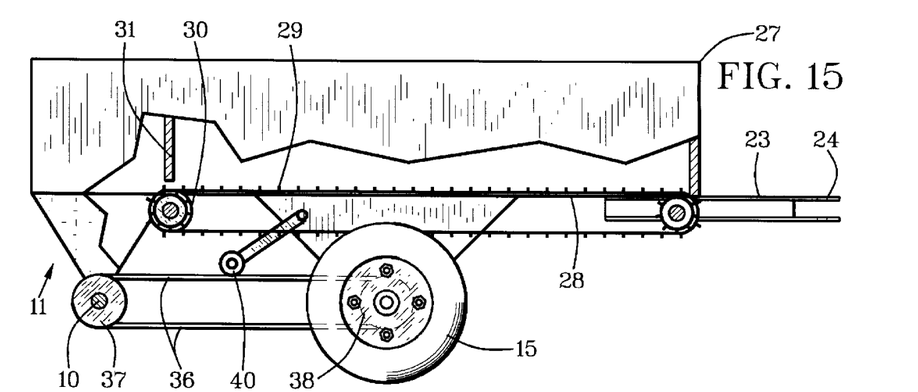
FIG. 15 is a partially cutaway side view of a manure-grinding fertilizer spreader having a mobile hopper proximate an aft end of a container bed and having belt-drive gearing as rotational gearing and also having a conveyor belt on the container bed.
Figure 16:
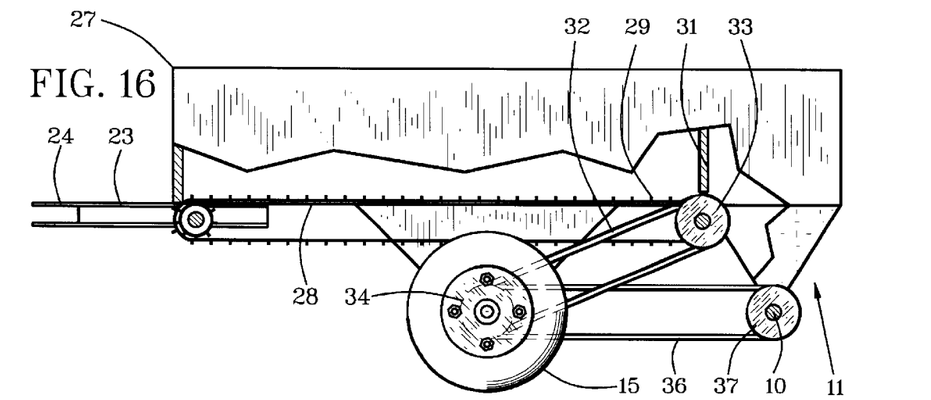
FIG. 16 is a partially cutaway side view that is opposite from the side shown in FIG. 15.
Figure 17:
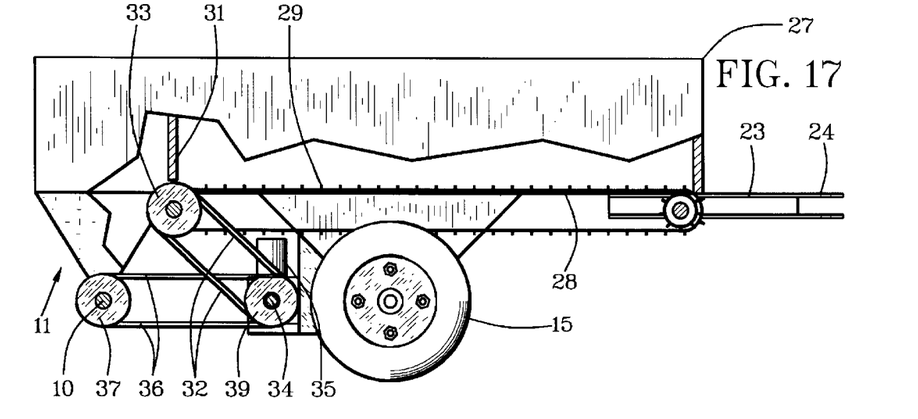
FIG. 17 is a partially cutaway side view of a manure-grinding fertilizer spreader having the mobile hopper proximate the aft end of the container bed and having an engine as a conveyor-power source and as the rotational-power source.

In FIGS. 15–17, the mobile hopper 11 includes a container bed 27 having the vehicle wheels 15 oppositely disposed at approximately a linear center of the container bed 27. A top of the mobile hopper 11 is approximately flush with a floor 28 of the container bed 27. A conveyor belt 29 is in communication with a conveyor wheel 30 proximate the top of the mobile hopper 11 to convey manure rearwardly to the mobile hopper 11. A flow-control gate 31 has a bottom edge situated pre-determinedly above the conveyor belt 29 to allow selected flow of contents of the container bed 27 into the mobile hopper 11 from rearward travel of the conveyor belt 29.

As shown in FIGS. 15–16, a conveyor-power source in rotational communication with the conveyor wheel 30 can include a conveyor V-belt 32 with a first V-belt wheel 33 on the conveyor wheel 30 and a second V-belt wheel 34 on the vehicle wheel 15. Known belt-grasping and belt-releasing devices that include idle wheels can be employed for engagement and disengagement of the conveyor V-belt 32.

As shown in FIG. 15 and 17, the conveyor V-belt 32 can be intermediate the first V-belt wheel 33 on the conveyor wheel 30 and the second V-belt wheel 34 on an engine 35 that is attached to the container bed 27.

The mobile-attachment for the container-bed 27 embodiments can include the tongue 23 and the tractor attachment 24 as a hitch as modified appropriately for larger sizes than for the handcart and smaller sizes described in relation to remaining figures.

The rotational-power source for the cutter axle 10 in container-bed 27 embodiments described in relation to FIGS. 15–17 can be either the wheels 15 or the engine 35. For the wheels 15, as shown from opposite sides in FIGS. 15–16, a cutter V-belt 36 is in communication intermediate a cutter-belt wheel 37 and a wheel V-belt 38. For the engine 35, the cutter V-belt 36 is in communication intermediate the cutter-belt wheel 37 and an engine V-belt wheel 39. For the second V-belt wheel 34 and the wheel V-belt 38, separate belt grooves are assumed.

Known belt-engagement and belt-disengagement mechanisms that include a controllable idler wheel 40 shown in FIG. 15 are assumed for engaging and disengaging the conveyor V-belt 32 and the cutter V-belt 36.

Figure 1:
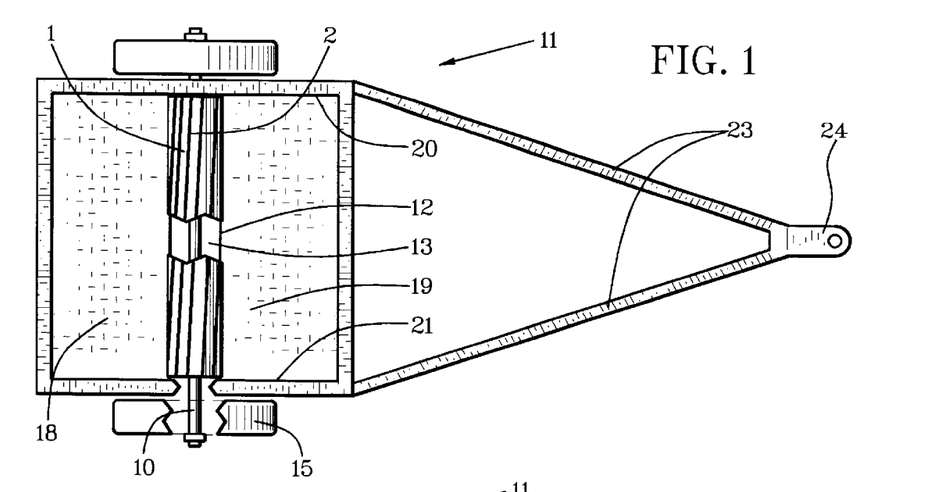
FIG. 1 is a partially cutaway top view of a manure-grinding fertilizer spreader having a spiral-bladed cylinder as a progressively bladed cylinder and having a tractor attachment as a mobile-power attachment.
Figure 2:
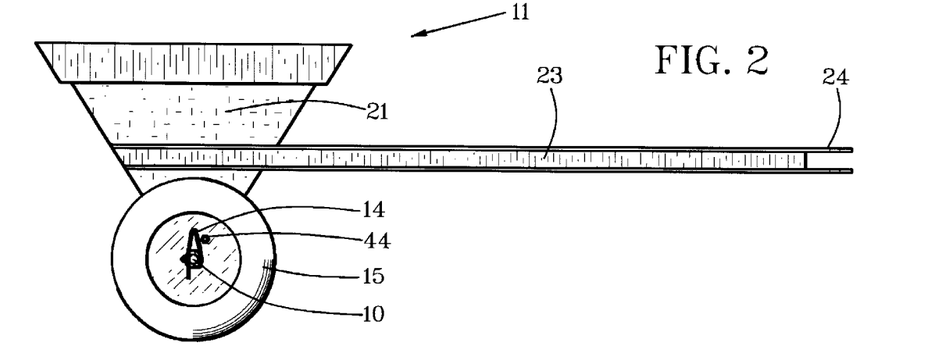
FIG. 2 is a side view of the FIG. 1 illustration.
Figure 3:
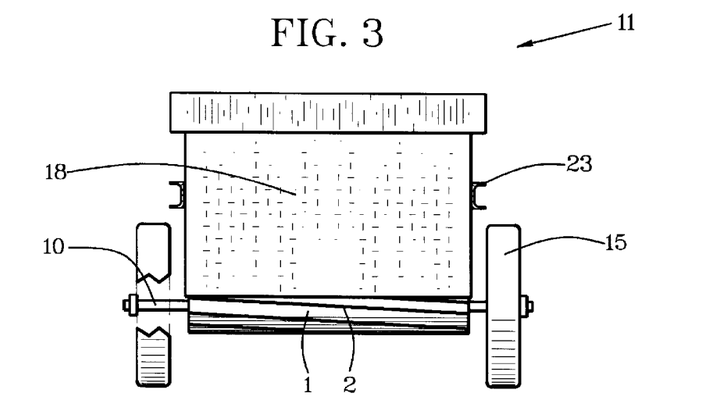
FIG. 3 is a partially cutaway rear view of the FIG. 1 illustration.
Figure 4:
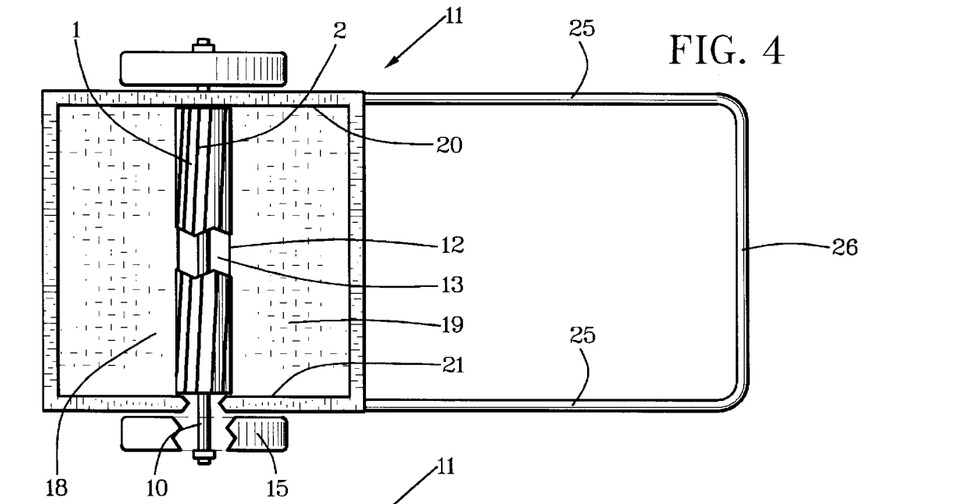
FIG. 4 is a partially cutaway top view of a manure-grinding fertilizer spreader having the spiral-bladed cylinder as a progressively bladed cylinder and having handcart traces as a mobile-power attachment.
Figures 5, 6:
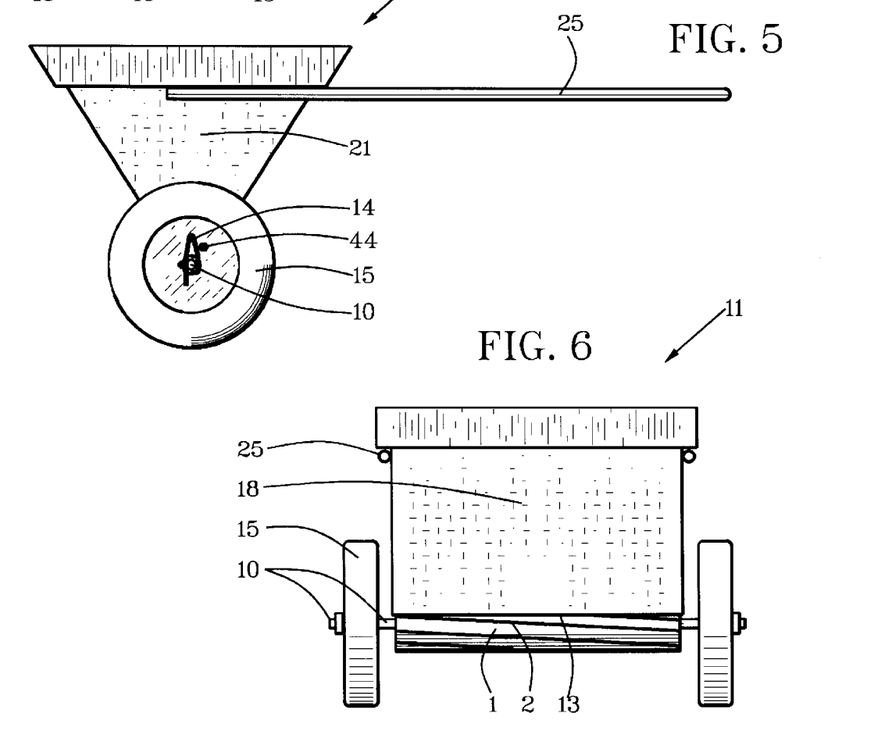
FIG. 5 is a side view of the FIG. 4 illustration.
FIG. 6 is a rear view of the FIG. 4 illustration.
Figure 7:
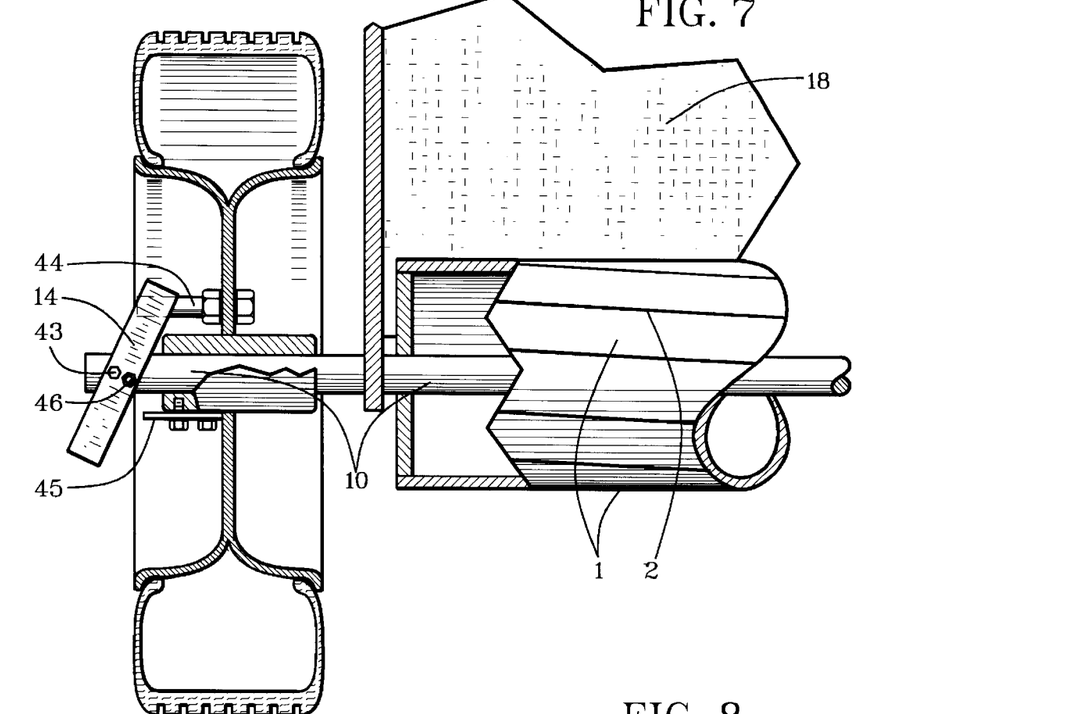
FIG. 7 is a partially cutaway rear view of a releasable connection of a wheel to a cutter axle.
Figure 8:
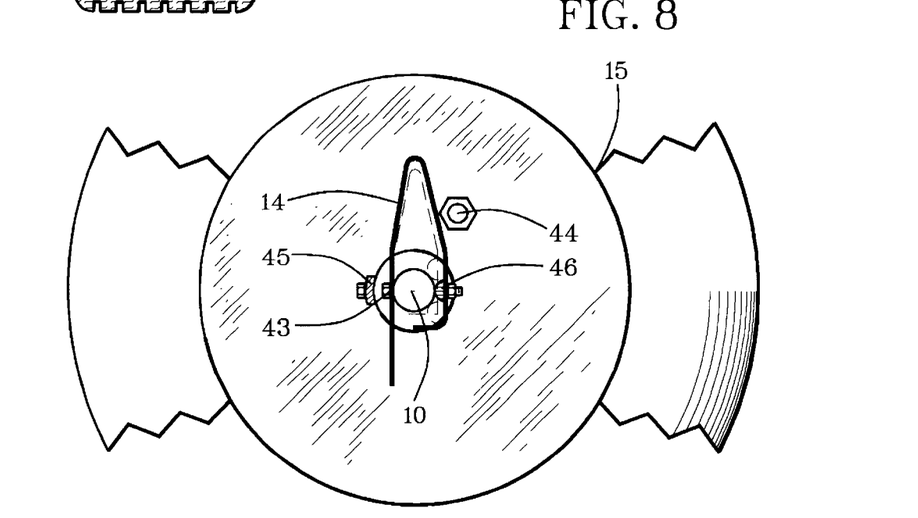
FIG. 8 is a partially cutaway end view of the FIG. 7 releasable connection of the wheel to the cutter axle.
Figure 9:
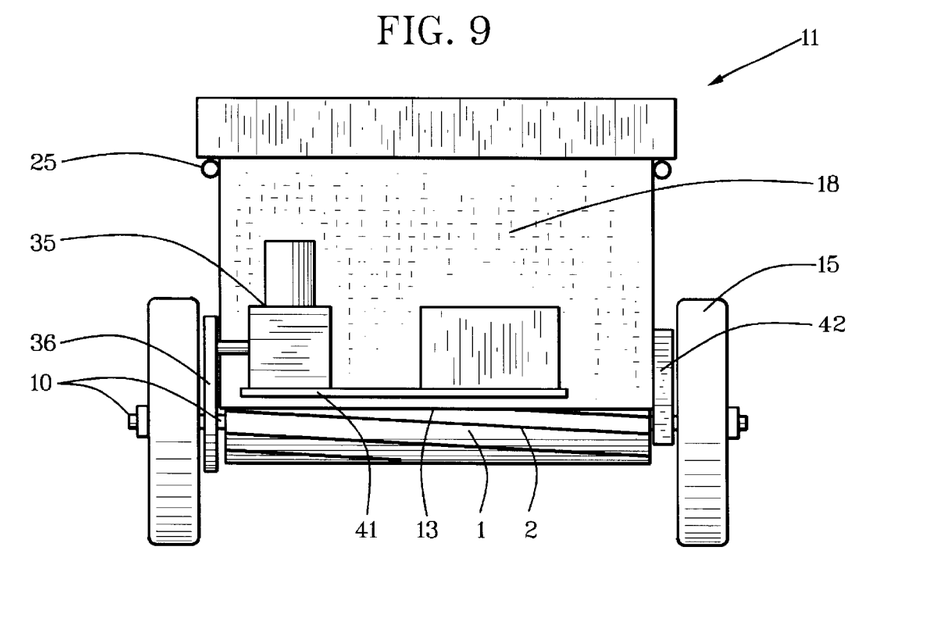
FIG. 9 is a rear view of an engine as a rotational-power source on the mobile hopper.
Figure 10:
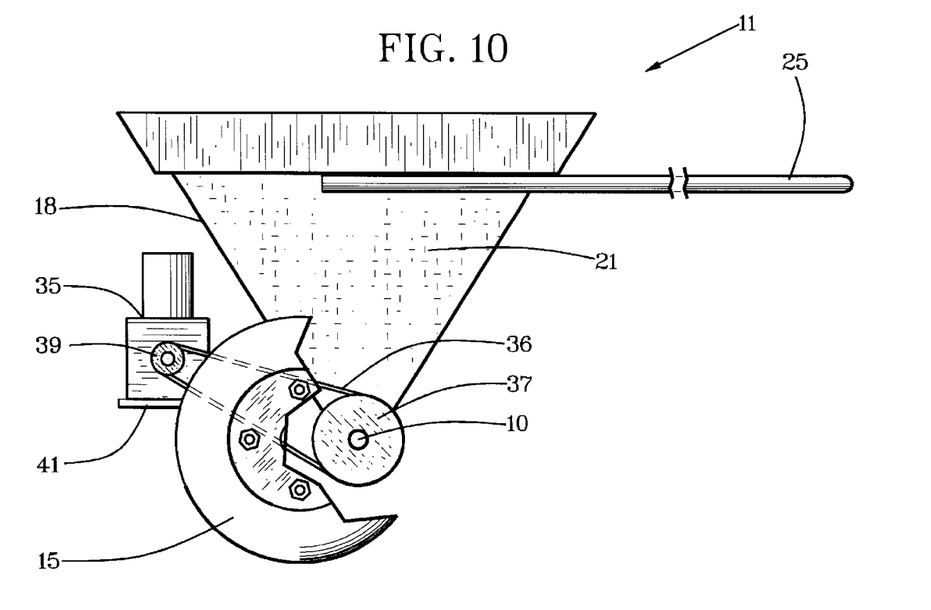
FIG. 10 is a partially cutaway side view of the FIG. 8 illustration.

In FIGS. 9–10, the engine 35, including a fuel tank and accessories, is situated on an engine platform 41 on the back wall 18 for conveyance of power with the cutter V-belt 36 intermediate the engine V-belt wheel 39 and the cutter-belt wheel 37 for rotation of the cutter axle 10. For this light embodiment with an engine for grinding and spreading manure, it is preferable that the wheels 15 be situated aft of the cutter axle 10 for even distribution of weight of the engine 35 and the mobile hopper 11 on the wheels 15. This can be done with wheel struts 42 shown in FIG. 9.

A new and useful manure-grinding fertilizer spreader having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A manure-grinding fertilizer spreader comprising:

a progressively bladed cylinder proximate a bottom of a mobile hopper having a grinder base in predetermined proximity to cutting edges of a plurality of progressive blades disposed circumferentially on an outside perimeter of the progressively bladed cylinder;

a cutter axle to which the progressively bladed cylinder is attached concentrically;

a discharge aperture in a bottom hopper portion that is downward from the grinder base;

the discharge aperture having parallel sides that are oppositely disposed a distance for receiving a predetermined portion of the progressively bladed cylinder;

a rotational-power source in rotational communication with the cutter axle for rotation of the progressively bladed cylinder proximate the bottom of the mobile hopper; and a mobile-power attachment on the mobile hopper.

2. The manure-grinding fertilizer spreader of claim 1 wherein:

the progressive blades have a predetermined closeness circumferentially on the progressively bladed cylinder for predetermined shortness of grinding of material intermediate the grinder base and top edges of the progressive blades; and the progressive blades have predetermined heights radially outward from the progressively bladed cylinder for predetermined fineness of grinding of material intermediate the grinder base and the top edges of the progressive blades.

3. A manure-grinding fertilizer spreader comprising:

a spiral-bladed cylinder proximate a bottom of a mobile hopper having a grinder base in predetermined proximity to cutting edges of a plurality of spiral blades disposed circumferentially on an outside perimeter of the spiral-bladed cylinder;

a cutter axle to which the spiral-bladed cylinder is attached concentrically;

a discharge aperture in a bottom hopper portion that is downward from the grinder base;

the discharge aperture having parallel sides that are oppositely disposed a distance for receiving a predetermined portion of the spiral-bladed cylinder;

a rotational-power source in rotational communication with the cutter axle for rotation of the spiral-bladed cylinder; and a mobile-power attachment on the mobile hopper.

4. The manure-grinding fertilizer spreader of claim 3 wherein:

the rotational-power source is a rotational connection intermediate the cutter axle and wheels with which the mobile hopper is mobile.

5. The manure-grinding fertilizer spreader of claim 4 wherein:

the wheels are rotational on the cutter axle;

the rotational connection includes a fastener lever that is pivotal selectively on the cutter axle to contact a wheel protrusion for transmitting rotation of the wheels to the cutter axle for rotation of the cutter axle by rotation of the wheels from movement of the mobile hopper; and a lock cam on a leaf-spring V-leg of the fastener lever to spring-cam-retain the fastener lever in a selected pivotal position of contact a protrusion on the wheel.

6. The manure-grinding fertilizer spreader of claim 3 wherein:

the rotational-power source is an engine on the mobile hopper; and the engine has a rotational shaft in predetermined rotational communication with the cutter axle.

7. The manure-grinding fertilizer spreader of claim 3 wherein:

the grinder base is in predetermined proximity to the spiral blades; and the spiral blades have predetermined heights radially outward from the spiral-bladed cylinder for predetermined fineness of grinding of manure passing intermediate the spiral blades and the grinder base.

8. The manure-grinding fertilizer spreader of claim 6 and further comprising:

a grinder blade on the grinder base;

the grinder blade is in predetermined proximity to rotational travel of the spiral blades; and the spiral blades have predetermined heights radially outward from the spiral-bladed cylinder for predetermined fineness of grinding of manure and straw-like material passing intermediate the spiral blades and the grinder blade.

9. The manure-grinding fertilizer spreader of claim 3 wherein:
the mobile-power attachment to the mobile hopper is a tongue with a tractor attachment.

10. The manure-grinding fertilizer spreader of claim 3 wherein:
the mobile-power attachment to the mobile hopper is a pair of handcart traces spaced apart to receive an individual between them and having a front cross rod.

11. The manure-grinding fertilizer spreader of claim 3 wherein:
the mobile hopper includes a container bed having oppositely disposed vehicle wheels at proximately a linear center of the container bed;
a top of the mobile hopper is approximately flush with a floor of the container bed;
a conveyor belt is in communication with a conveyor wheel proximate the top of the mobile hopper to convey manure rearwardly to the mobile hopper;
a flow-control gate has a bottom edge situated predeterminedly above the conveyor belt to allow selected flow of contents of the container bed into the mobile hopper from rearward travel of the conveyor belt;
a conveyor-power source in rotational communication with the conveyor wheel; and
container-bed side walls to prevent contents of the container bed from falling off of the container bed.

12. The manure-grinding fertilizer spreader of claim 11 wherein:
the mobile-power attachment is a predetermined hitch for hitching the container bed to a predetermined class of vehicles.

13. The manure-grinding fertilizer spreader of claim 11 wherein:
the conveyor-power source is a predetermined engine having predetermined conveyor-rotation gearing in rotational communication with the conveyor wheel.

14. The manure-grinding fertilizer spreader of claim 11 wherein:
the conveyor-power source is predetermined rotational gearing intermediate at least one of the vehicle wheels and the conveyor wheel.

15. The manure-grinding fertilizer spreader of claim 14 wherein:
the predetermined rotational gearing is a V-belt with a first V-belt wheel on the conveyor wheel and a second V-belt wheel on the vehicle wheel.

16. The manure-grinding fertilizer spreader of claim 11 wherein:
the rotational-power source is an engine having predetermined rotational gearing in rotational communication with the cutter axle.

17. The manure-grinding fertilizer spreader of claim 11 wherein:
the rotational-power source is predetermined rotational gearing intermediate at least one of the vehicle wheels and the cutter axle.

18. The manure-grinding fertilizer spreader of claim 17 wherein:
the predetermined rotational gearing is a V-belt with a first V-belt wheel on the cutter axle and a second V-belt wheel on the vehicle wheel.

19. The manure-grinding fertilizer spreader of claim 3 wherein:
the spiral blades have a predetermined closeness circumferentially on the spiral-bladed cylinder for predetermined shortness and fineness of grinding of material intermediate the grinder base and top edges of the spiral blades.

20. A manure-grinding fertilizer spreader comprising:
a stagger-bladed cylinder proximate a bottom of a mobile hopper having a grinder base in predetermined proximity to cutting edges of a plurality of staggered blades disposed circumferentially on an outside perimeter of the stagger-bladed cylinder;
a cutter axle to which the stagger-bladed cylinder is attached concentrically;
a discharge aperture in a bottom hopper portion that is downward from the grinder base;
the discharge aperture having parallel sides that are oppositely disposed a distance for receiving a predetermined portion of the stagger-bladed cylinder;
a rotational-power source in rotational communication with the cutter axle for rotation of the stagger-bladed cylinder; and
a mobile-power attachment on the mobile hopper.

21. The manure-grinding fertilizer spreader of claim 20 wherein:
the staggered blades have a predetermined closeness circumferentially on the spiral-bladed cylinder for predetermined shortness of grinding of material intermediate the grinder base and top edges of the staggered blades; and
the staggered blades have predetermined heights radially outward from the stagger-bladed cylinder for predetermined fineness of grinding of material intermediate the grinder base and the top edges of the staggered blades.

22. The manure-grinding fertilizer spreader of claim 20 wherein:
the staggered blades are arcuate with a predetermined cutting edge.

23. The manure-grinding fertilizer spreader of claim 21 wherein:
the staggered blades are arcuate with a predetermined cutting edge.

24. A manure-grinding fertilizer spreader comprising:
a wave-bladed cylinder proximate a bottom of a mobile hopper having a grinder base in predetermined proximity to cutting edges of a plurality of waved blades disposed circumferentially on an outside perimeter of the wave-bladed cylinder;
a cutter axle to which the wave-bladed cylinder is attached concentrically;
a discharge aperture in a bottom hopper portion that is downward from the grinder base;
the discharge aperture having parallel sides that are oppositely disposed a distance for receiving a predetermined portion of the wave-bladed cylinder;
a rotational-power source in rotational communication with the cutter axle for rotation of the wave-bladed cylinder; and
a mobile-power attachment on the mobile hopper.

25. The manure-grinding fertilizer spreader of claim 24 wherein:
the waved blades have a predetermined closeness circumferentially on the spiral-bladed cylinder for predetermined shortness of grinding of material intermediate the grinder base and top edges of the waved blades; and the waved blades have predetermined heights radially outward from the wave-bladed cylinder for predetermined fineness of grinding of material intermediate the grinder base and the top edges of the waved blades.

* * * * *